United States Patent
Kell (10) Patent No.: US 8,910,593 B2
(45) Date of Patent: Dec. 16, 2014

(54) LIVESTOCK TRAILER CORRAL ASSEMBLY

(76) Inventor: Randy Kell, Raymondville, MO (US)

( * ) Notice: Subject to any disclaimer, the term of this patent is extended or adjusted under 35 U.S.C. 154(b) by 243 days.

(21) Appl. No.: 12/790,208

(22) Filed: May 28, 2010

(65) Prior Publication Data

US 2010/0300373 A1 Dec. 2, 2010

Related U.S. Application Data

(60) Provisional application No. 61/217,278, filed on May 29, 2009.

(51) Int. Cl.
| | |
|---|---|
| *A01K 1/00* | (2006.01) |
| *A01K 1/06* | (2006.01) |
| *A01K 1/02* | (2006.01) |
| *A01K 3/00* | (2006.01) |
| *B60P 3/04* | (2006.01) |

(52) U.S. Cl.
CPC ............ *A01K 1/0613* (2013.01); *A01K 1/0236* (2013.01); *A01K 1/0272* (2013.01); *A01K 3/00* (2013.01); *B60P 3/04* (2013.01)
USPC .......................................... 119/400; 119/512

(58) Field of Classification Search
USPC .......... 119/400, 412, 415, 502, 512, 516, 519, 119/523, 524; 296/24.31; 105/157.1, 159, 105/355
See application file for complete search history.

(56) References Cited

U.S. PATENT DOCUMENTS

| | | | | |
|---|---|---|---|---|
| 2,432,228 A | * | 12/1947 | De Lano | 410/26 |
| 3,741,529 A | * | 6/1973 | Blagg | 256/26 |
| 4,250,836 A | * | 2/1981 | Smith | 119/512 |
| 4,273,072 A | * | 6/1981 | Choisel | 119/516 |
| 4,898,121 A | | 2/1990 | Reynolds | |
| 4,924,813 A | * | 5/1990 | Bixler et al. | 119/848 |
| 5,174,240 A | | 12/1992 | Darvill | |
| 5,213,061 A | | 5/1993 | Zito | |
| 5,381,757 A | | 1/1995 | Putney | |
| 5,660,143 A | | 8/1997 | Waring-Brown | |
| 5,924,385 A | | 7/1999 | Cossel | |
| 5,950,562 A | | 9/1999 | Schulte et al. | |
| 6,067,940 A | | 5/2000 | Holder | |
| 6,450,124 B1 | | 9/2002 | Calvert et al. | |
| 6,609,480 B2 | * | 8/2003 | Daniels et al. | 119/752 |
| 7,028,638 B2 | * | 4/2006 | Bonsall | 119/400 |
| 7,146,933 B1 | * | 12/2006 | Dubas | 119/519 |
| 7,174,853 B1 | | 2/2007 | Donaldson | |
| 7,216,605 B2 | * | 5/2007 | Cupps | 119/412 |
| 7,237,510 B2 | | 7/2007 | White | |

(Continued)

*Primary Examiner* — Rob Swiatek
*Assistant Examiner* — Lisa Tsang
(74) *Attorney, Agent, or Firm* — Lathrop & Gage LLP (57) ABSTRACT

A removable corral assembly for use in a livestock trailer which includes a plurality of interlocking livestock panels. The panels are in a substantial U-shape so when they are installed in the livestock trailer a left aisle and right aisle are formed with a middle or center aisle which is segregated. The worker stands in the center aisle and is protected from livestock being worked in the left and right aisles. A catch gate or squeeze chute may be associated with the corral assembly and positioned near the rear opening of the trailer in either the left or right aisle. Rollers, wheels or similar mechanisms are fastened to the panel assembly so that the corral can easily be rolled in to and out of a livestock trailer. Varying panel sizes may be used to adjust the overall dimensions of the corral assembly for installation in trailers having varying sizes.

3 Claims, 8 Drawing Sheets

(56) References Cited

U.S. PATENT DOCUMENTS

2005/0028752 A1* 2/2005 Thibault et al. .............. 119/524
2008/0022883 A1* 1/2008 Schorr et al. ..................... 105/3
2009/0000564 A1* 1/2009 Meyer, Jr. ..................... 119/514
2009/0064941 A1* 3/2009 Daniels ......................... 119/512

* cited by examiner

FIG. 6

LIVESTOCK TRAILER CORRAL ASSEMBLY

RELATED APPLICATIONS

This application claim benefit of U.S. Patent Application Ser. No. 61/217,278, filed May 29, 2009, the disclosure of which is incorporated herein by reference.

BACKGROUND OF THE INVENTION

The present invention relates to a corral and head gate assembly for use in a livestock trailer and more particularly to such an assembly that is quickly and easily installed or removed.

Livestock corrals are commonplace on farms, ranches and feed lots. Corral assemblies typically include a number of fences, panels or gates all interconnected to form various chutes, runways, capture or loading facilities for livestock. Such corral assemblies are generally permanent structures and are often found built adjacent to barns or other buildings.

It is not uncommon, however, for farmers and ranchers to have widespread fields, pasture land or even feed lots where it is impractical or overly expensive to have a permanent corral system. It is also impractical and unduly expensive to install permanent corral and livestock catching facilities on leased or rented pasture land where the livestock owner might have to leave the permanent corral system as a fixture to the real state upon termination of the lease. Another significant drawback to permanent corral and livestock capturing facilities is that animals have to either be loaded in a transport vehicle and hauled to the facility or otherwise forcibly driven to the permanent structure.

Livestock trailers come in a variety of dimensions ranging in width from five to eight feet and lengths from approximately 12 to approximately 40 feet long. Livestock trailers are very convenient to load and transport animals from and to remote locations. It is common practice to load livestock into transport trailers in fields or pasture land by assembling a temporary corral external the trailer into which the animals are driven, then captured and then loaded on to the trailer. Assembling even a temporary corral for loading livestock into a trailer, however, is time consuming and labor intensive. Moreover, if a single, or very few, animals are to be loaded, it can take substantial time to capture the animal, place it in the trailer and then haul it to a remote location. What is desirable is a portable livestock trailer which includes an internal corral system which allows easy loading, sorting, inspection or working of livestock. However, because livestock trailers are also used for hauling animals for relocation, and any other variety of purposes, a livestock trailer with a dedicated internal corral assembly may be impractical and too expensive for sporadic use. Accordingly, a corral assembly with a livestock catch system which could be quickly installed into a livestock trailer for use and then removed therefrom when not in use would solve several of the identified problems. Such a system would allow a conventional livestock trailer to be retrofit with a corral and livestock catch assembly. Moreover, it would allow the livestock trailer to be used for hauling and transporting animals when the corral and catch assembly is not needed. Finally, such an assembly would allow the user to have an easily transportable and versatile livestock corral for use in remote locations and would preclude the need for multiple fixed corral system.

SUMMARY OF THE INVENTION

The present invention is a new corral assembly and livestock catching device which is removably installed into a livestock trailer. The corral assembly comprises a substantially U-shaped system of cattle panels mounted on rollers. The corral assembly can easily be rolled in to a livestock trailer to form two animal working aisles and a protected internal aisle for the user. A conventional head gate or catch gate is installed on one side of the corral panel assembly and may be hinged for opening. One side of the catch gate can be removably fastened to the rear most portion of the livestock trailer for stability. In a second embodiment of the invention the conventional catch gate is replaced by a squeeze chute of common design which is mounted to one side of the corral assembly. When the corral assembly is in place either the catch gate or the squeeze chute assembly is located near the back of the trailer. Animals to be worked or loaded into the aisle alleyway opposite the catch gate or squeeze chute and are maneuvered toward the front of the trailer, around the bend of the U-shaped corral assembly and down the working aisle of the system. The operator remains in the central aisle and is protected from direct contact with the animals as they are moved about the alleyways. Any number of hinged swing gates can be provided to segregate animals as they are worked through the system. An animal to be worked is captured in the catch gate or squeeze chute assembly and can be directly released exterior the trailer after the work is completed. Because most livestock trailers are provided with side gates, the innovative corral assembly also works well for sorting livestock in to different groups by selectively releasing animals out the trailer side gates into independently corralled areas.

The innovative corral assembly is an unitary device which can be easily rolled into a livestock trailer. It is to be understood that several different sizes of corral assemblies may be provided for use in varying sized trailers. Because the system is unitary and on wheels or other rollers, it does not necessarily have to be attached to the interior of the livestock trailer when installed. It may be preferable, however, to have multiple bracing units that contact the ceiling or sides of the trailer without impeding the travel pathway of the animals. This will add stability to the system and decrease the likelihood of damage to the system by animals during use.

When the internal corral assembly is no longer needed, it is simply rolled out of the livestock trailer and stored until the next use. Installation and use of the assembly does not require any modification to existing livestock trailers and does not cause any damage or undue wear on the livestock trailers.

In one configuration of the inventive device, additional short panels may be used on the sides or the board portion of the corral assembly which can be easily removed to adjust the dimensions of the device.

DESCRIPTION OF THE INVENTION

Referring now generally to the drawings, a removable corral assembly is provided for use in a livestock trailer. The corral assembly can be adapted and fit into a livestock trailer having virtually any dimensions. The livestock trailer will have a forward portion connectable to a truck or other towing vehicle and a rearward open end in to which animals are loaded. A pair of opposed sides span between the forward and rearward end of the trailer.

Livestock trailers are generally configured in one of two manners, one for bumper hitch attachment and one for goose neck attachment. It is understood that the inventive device can be used in either type of trailer. Moreover, trailers vary in width between approximately five feet and approximately eight feet wide and can have a length from between approximately 10 feet and over 40 feet. Again, the inventive device can be sized for use in a trailer having any of these dimensions.

Figure 1:
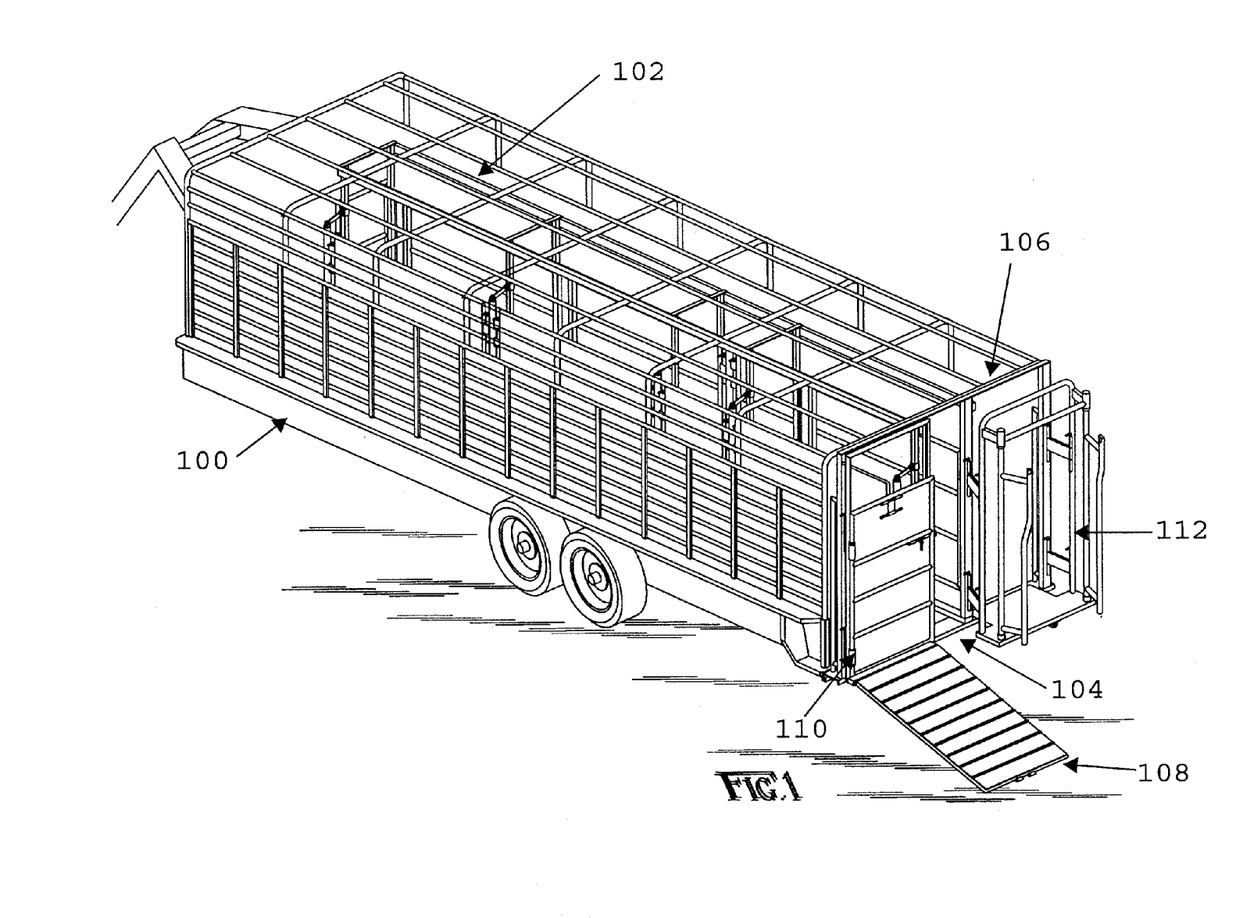
FIG. 1 is a perspective view of an embodiment of the corral assembly installed in a trailer.

Referring now to FIG. 1 a removable corral assembly 102 is shown installed in a livestock trailer 100. As will be seen more clearly in relation to later figures, corral assembly 102 comprises a first end 104 located adjacent to and across the open rear end 106 of the trailer 100. In various embodiments of the corral assembly 102, various gates and chutes are mounted on the first end 104 to control the flow of livestock through the trailer 100. In the embodiment shown in FIG. 1, a ramp 108 and gate 110 are provide to control the entry of livestock into the trailer 100, and a head gate 112 to hold the livestock for processing and to control the release of the livestock from the trailer 100. The gate 112 may also comprise a squeeze chute or other livestock control device. Other gates or control devices may be provided as are known in the art.

Figure 2:
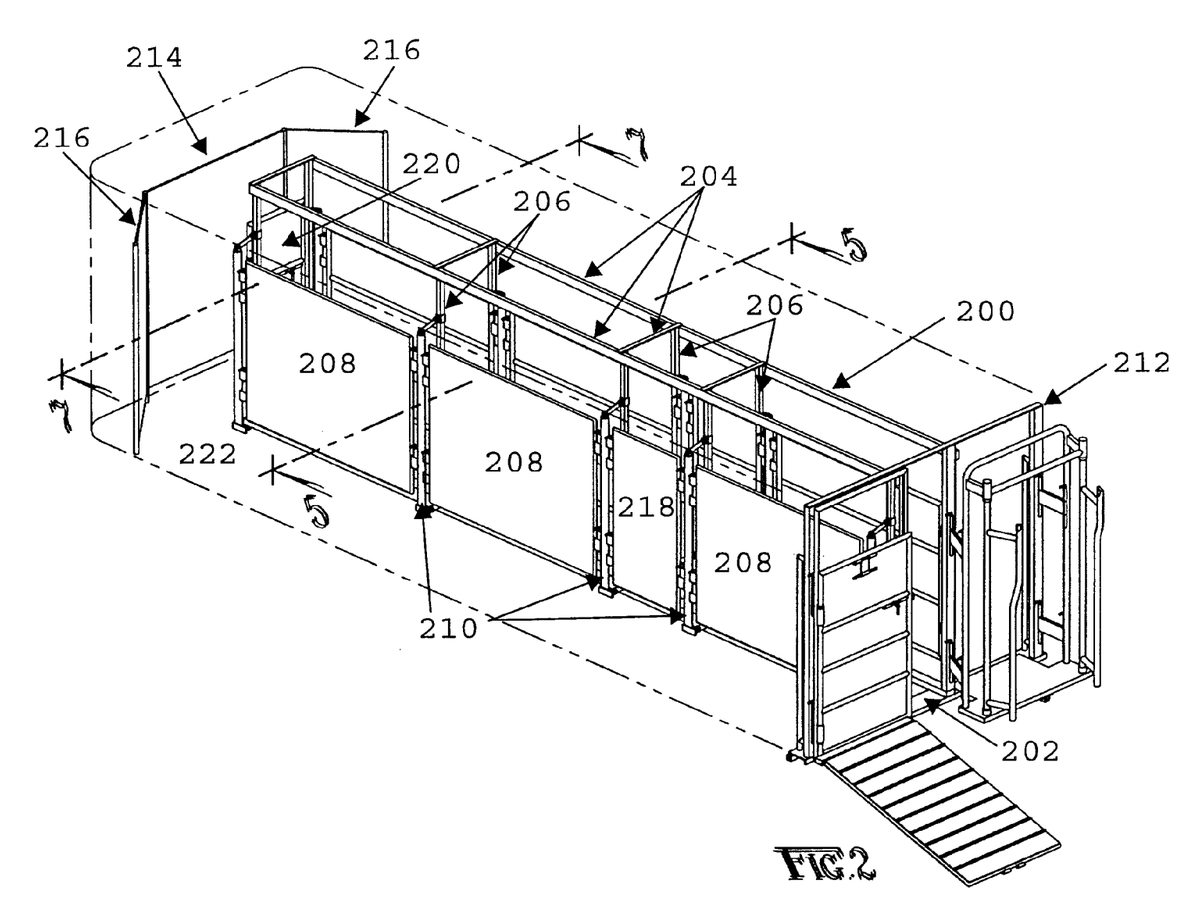
FIG. 2 is a perspective view of an embodiment of the corral assembly.

Referring now to FIG. 2, a perspective view of the corral assembly 102 is shown with the trailer 100 removed from the figure. The dashed lines denote the rough inner volume of the trailer 100 and indicate the location of the corral assembly 102 within that volume when installed therein. The assembly 102 comprises a frame 200 on which other components of the system are supported. The frame 200 defines a central walkway 202 down which workers may move to handle the livestock in the trailer 100. Frame 200 is comprised of various horizontal frame members 204 and vertical frame members 206. Frame members 204 and 206 are preferably formed from metal of various kinds, though other materials such as wood may be used if sufficiently light and strong to provide the necessary support for the other components of the assembly 102. Frame members 204 and 206 may be joined together by welding, bolting or other means of attachment of sufficient strength as are known to those of skill.

Panels 208 are supported by frame 200 and define the livestock path through the trailer 100. In some embodiments of the corral assembly 102, panels 208 are formed from rigid fencing material often referred to as livestock panels. Each panel 208 has a frame encompassing a field material. Two common configurations of such panels exist. One type of panel 208 is similar to a farm gate and has spaced apart vertical end poles with a plurality of horizontally spaced bars interposing the end poles, comprising the field material. A second common livestock panel 208 has a rigid rectangular frame with a woven wire comprising the field material. Such panels 208 are often referred to as hog panels. Other embodiments of the panels 208 may incorporate sheets of metal, wood or other suitable material for the field of the panel 208. Panels 208 of either configuration are generally provided with panel mounts 210 on each end thereof to connect the panel 208 to the frame 200. Panel mounts 210 are described in more detail in reference to a later figure.

At the first end 104 of the assembly, a gate frame 212 is provided for attaching the ramp 108, gate 110, and head gate 112 to the frame 200. As mentioned above, other configurations of gates and ramps may be provide and attached to frame 200 by gate frame 212.

In some embodiments of the corral assembly 102, an end piece 214 is provided to further define a livestock path through the trailer. The end piece 214 comprises a plurality of panels 216 provided to prevent the livestock from getting turned around in the front corners of the trailer. The panels 216 are formed in the same manner and materials as panels 208. In the embodiment shown in the figure, the end piece 214 comprises three panels 216 pivotally attached to each other at the edges thereof. The end piece 214 may be formed from separate panels place to prevent livestock access to the corners of the trailer 100, or from more than 3 panels 216, as may be required in some embodiments.

If the removable corral assembly is to have a fixed dimension for use in a trailer having specific dimensions, each panel 208 can be singular and continuous having no joints and no connectors. It is preferable, however, that multiple panels 208 are used to make up the corral assembly 102. Further, short panels 218 can be provided which can be used to adjust the overall length or width of the assembly 102 or to use as swing gates to block the livestock path. Similarly, a plurality of swing gates may be provided along any of the panels 208 to span between the panel 208 and the side of the trailer. These swing gates allow animals to be segregated within the aisles for any variety of reasons. An end panel 220 is also provided to define the end of the walkway 202.

When installed in to the livestock trailer 100, this assembly 102 creates a substantially u-shaped livestock path 222 around the outside surface of the panels 208, 218 and 220 and the inside surface of the trailer 100 and panels 216. Central walkway 202 is formed between the panels 208 and 218.

In other embodiments, stabilizer bars may optionally be positioned near the top of the frame 200 to span between the upper portion of the frame 200 and the roof or ceiling of the livestock trailer 100. Additional stabilizer bars may be provided which span between the frame 200 and the sides of the livestock trailer 100. The stabilizer bars, if provided, diminish the likelihood that livestock will move the assembly 102 within the trailer 100 causing damage to the assembly 102, the trailer 100, the worker or themselves.

Figure 3:
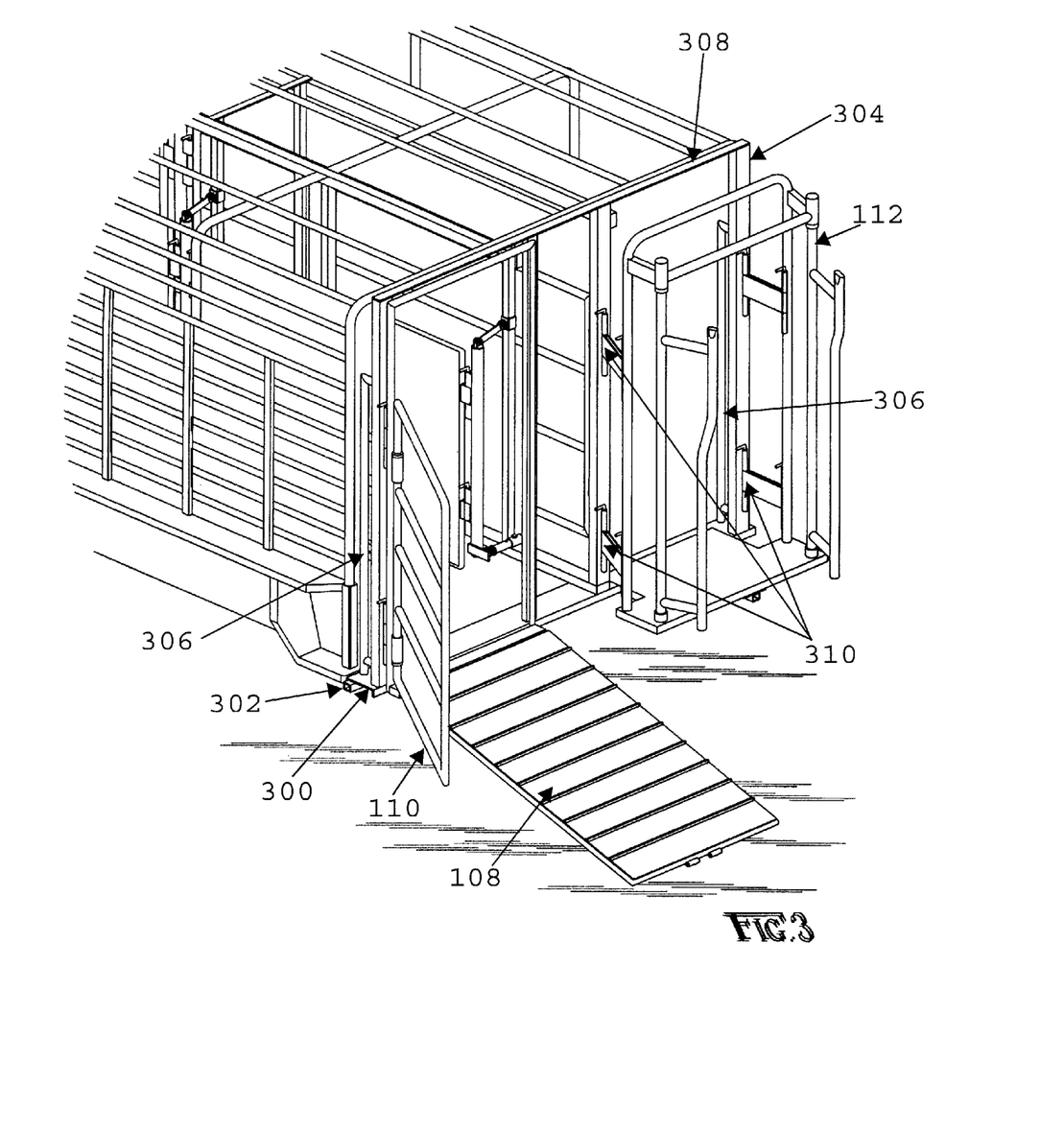
FIG. 3 is a partial perspective view of an embodiment of the corral assembly installed in a livestock trailer.

Referring now to FIG. 3, a detailed perspective view of the gate frame 212 is depicted. In the embodiment shown in the figure, the gate frame 212 comprises a base 300. The base 300 is supported by tube member 302. A plurality of vertical members 304 define the opening of gate frame 212, and side walls 306 may be provided on one or more of the vertical members 304 to provide, extra strength and prevent inadvertent entry by livestock into the gap between the gate frame 212 and the opening 106 of trailer 100. Top member 308 connects the top ends of members 304 to each other. In other embodiments of the corral assembly 102 the exact structure of the gate frame 212 may be varied and still be within the scope of the corral assembly disclosure.

In the embodiment of the invention shown in the figures, a catch gate 112 is removably attached to the gate frame 212 by pin hinges 310 mounted on vertical members 304 so that it will be substantially adjacent and aligned with the rear opening 106 of the livestock trailer when the corral assembly 102 is installed. The catch gate 112 will be of conventional manufacture and any number of catch gates are readily available in the marketplace. It is preferred that the catch gate 112 be removably fastened to the gate frame 212 and may be hinged so that it can be selectively opened to allow animals to exit the trailer 100. This gate frame 212 provides strength and rigidity to the gate 112 and eliminates the need to fasten the gate 112 directly to the livestock trailer 100. It is should be understood that the orientation and placement of the catch gate 112 can be reversed and attached to the other side of the corral assembly if desired.

An entire squeeze chute assembly, not shown in the figures, may be incorporated into the corral assembly. Similar to the catch gate 112 previously described, squeeze chutes are well known within in the industry and any number of readily available squeeze chutes can be adapted for use with this invention. It is to be generally understood, however, that such a squeeze chute will only properly work in a trailer which is wide enough to accommodate standard squeeze chutes which are usually at least 30 inches wide. Accordingly, in narrow trailers, the width of the central aisle 202 may have to be decreased to accommodate the squeeze chute on one side of the trailer and leave an aisle which is large enough to accommodate livestock on the opposite side of the trailer. This can be achieved by adjusting the panels 208 as described in reference to a later figure.

The opposite end of the gate frame 212 may be provided with a ramp 108 that is pivotally attached to the base 300, and a swing gate 110 pivotally attached to vertical member 304. Other configurations may be provided for gates and ramps on the two ends of the gate frame 212 as desired.

Figure 4:
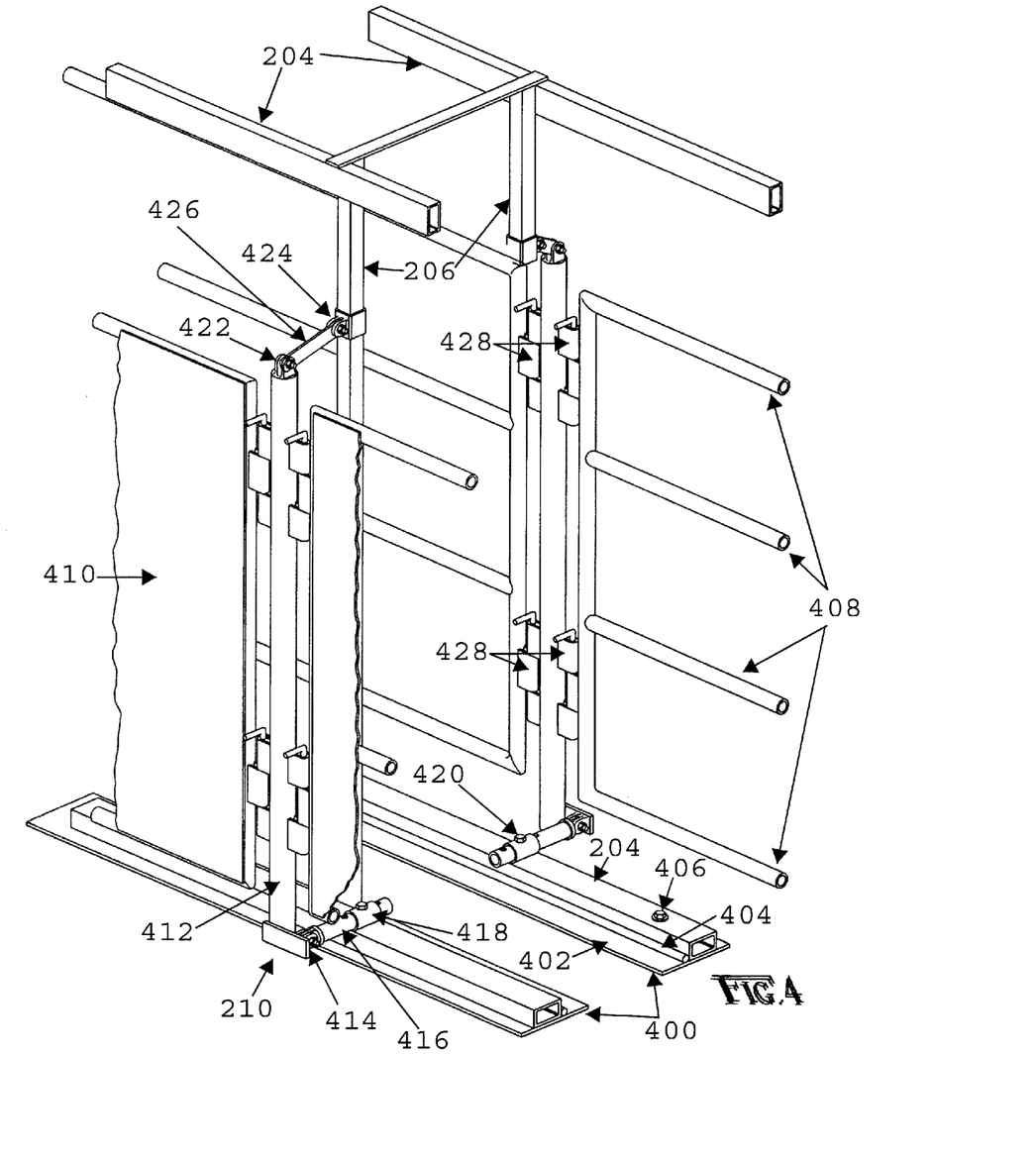
FIG. 4 is a partial perspective view of an embodiment of the corral assembly installed in a livestock trailer.

Referring now to FIG. 4, a detailed cut-away view of a portion of the corral assembly 102 is depicted. For purposes of clarity, some elements of the corral assembly have been removed from this view, either in whole or in part.

Two rails 400 are provided for supporting and guiding the frame 200 as it is installed into a trailer 100. The rails comprise a plate 402 on which the frame 200 rests, and a guide 404 attached to the plate 400 which maintains the position of the frame 200 on the rail 400. The rails 400 are installed into the trailer 100 prior to the installation of the frame 200. They are secured along the length of the floor of the trailer 100, preferably by releaseable means such as bolts. The rails are spaced apart such that the bottom horizontal members 204 of frame 200 rest on the base 402 against the outer side of guide 404. Once installed the bottom horizontal member 204 may be bolted to the rail 400 by bolt 406 to secure the frame 200 in place during use.

Panels 208, in the embodiment shown in FIG. 4, comprise panel members 408 which define the size and shape of panel 208, and field material 410 which is attached to the panel members 408 to prevent livestock from stepping through or inserting their heads through the panels 208. As discussed above, the field material 410 may be a wire or mesh panel, or may be sheet material of an appropriate type.

In the embodiment shown in FIG. 4, panel mount 210 comprises a support pole 412. In the embodiment shown in the figures, each support pole is positioned adjacent to a vertical frame member 206. The lower end of support pole 412 comprises a pivot mount 414. A base support 416 is pivotally attached at a first end to pivot mount 414. Base support 416 is slidably retained in collar 418 which is itself secured to a bottom frame member 204 of frame 200. A means for securing base support 416 within collar 418, such as bolt 420 is provided to allow support 416 to be fixed at a certain position. By removing bolt 420, sliding support member 416 to a desired position, and reinserting bolt 420, the position of panels 208 may be adjusted as needed.

The upper end of support pole 412 is provided with a second pivot mount 422 fixedly attached thereto. A pivot mount 424 is also provided on the adjacent vertical frame member 206. The pivot mount 424 is slidably retained on the vertical frame member 206, and can be moved up and down and secured along frame member 206 as desired. A panel support member 426 is provided to connect pivot mount 422 to pivot mount 424. The connections between panel support member 426 and mounts 422 and 424 respectively are pivotal allowing mount 424 to be moved up and down on frame member 206 to vary the distance between the top end of support pole 412 and frame 200.

Panels 208 are attached to support poles 412 by hinges 428. A single panel can be swung away from frame 200 like a gate by removing the pins from the hinges 428 on one end of the panel 208. Similarly, short panels 218 may be used as a control gate within the livestock path 222 by removing the pins from the hinges 428 on one side of the panel 218 and swinging the panel across the livestock path 222. In some embodiments, some panels 208 or 218 may have hinges on only one side, and are secured to the support pole 412 on the opposite side by a bolt-style gate latch for ease of opening and closing the panel during use.

The described means of attaching support pole 412 to the frame 200 allow the pole 412, and the panels 208 attached to it, to be adjusted in and out from frame 200, and also to be leaned in and out from the frame 200. Support pole 412 pivots on mount 414, so as mount 424 is moved up and down on frame member 206, the support pole 412 pivot around mount 414, leaning either away from or toward the frame 200. Since panels 208 are attached to support poles 412, this allows the panels 208 to be adjusted in a similar manner.

Figure 5:
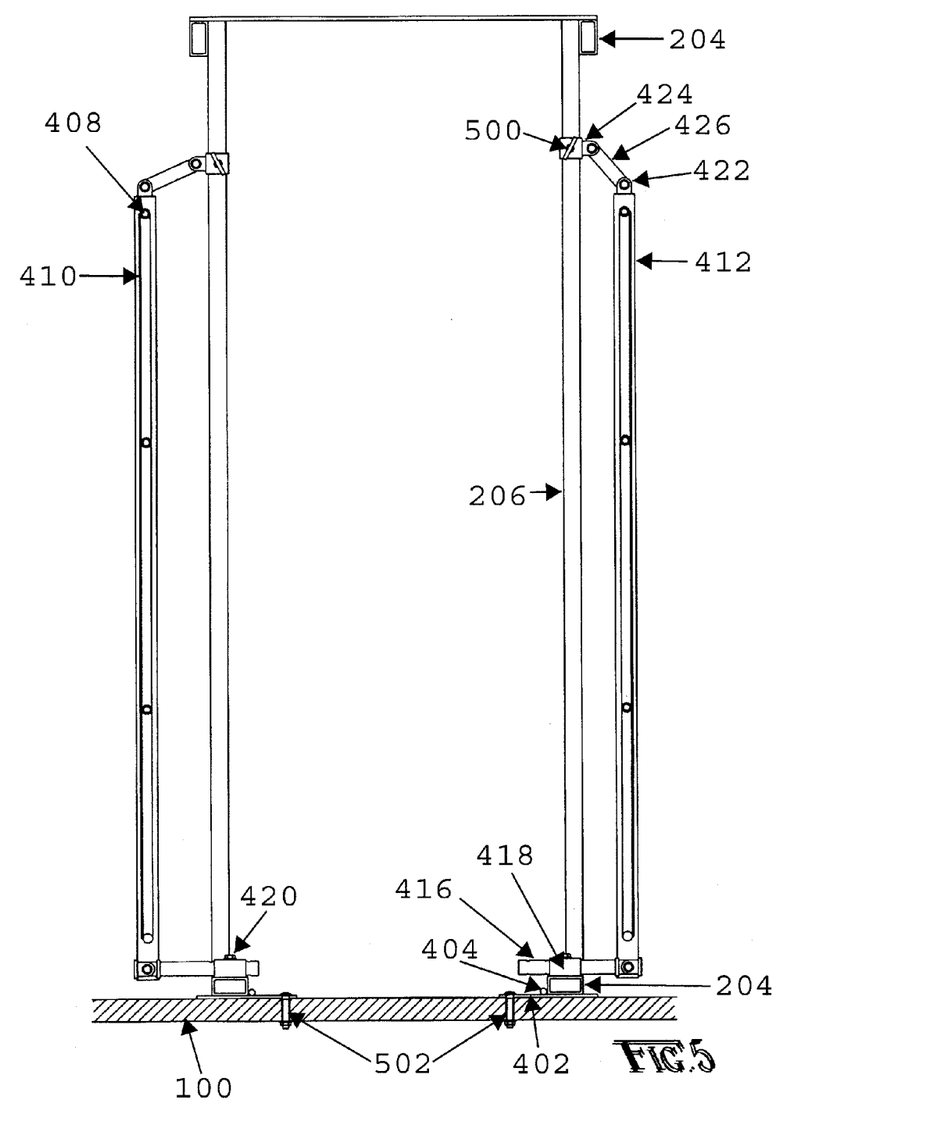
FIG. 5 is cross-sectional view of an embodiment of the corral assembly installed in a livestock trailer.

Referring now to FIG. 5, a cross-sectional view of an embodiment of the corral assembly 102 is depicted. The elements of the structure that support the panels 208 can be seen in this figure, including support pole 412, pivot mount 414, support 416, collar 418, pivot mounts 422 and 424 and member 426. The means for slidably retaining mount 424 on member 206 is depicted in this embodiment as screw 500 provided with a head receptive to hand adjustment. Also visible in this figure are bolts 502 for releasably securing the plates 402 of rails 400 to the floor of trailer 100.

Figure 6:
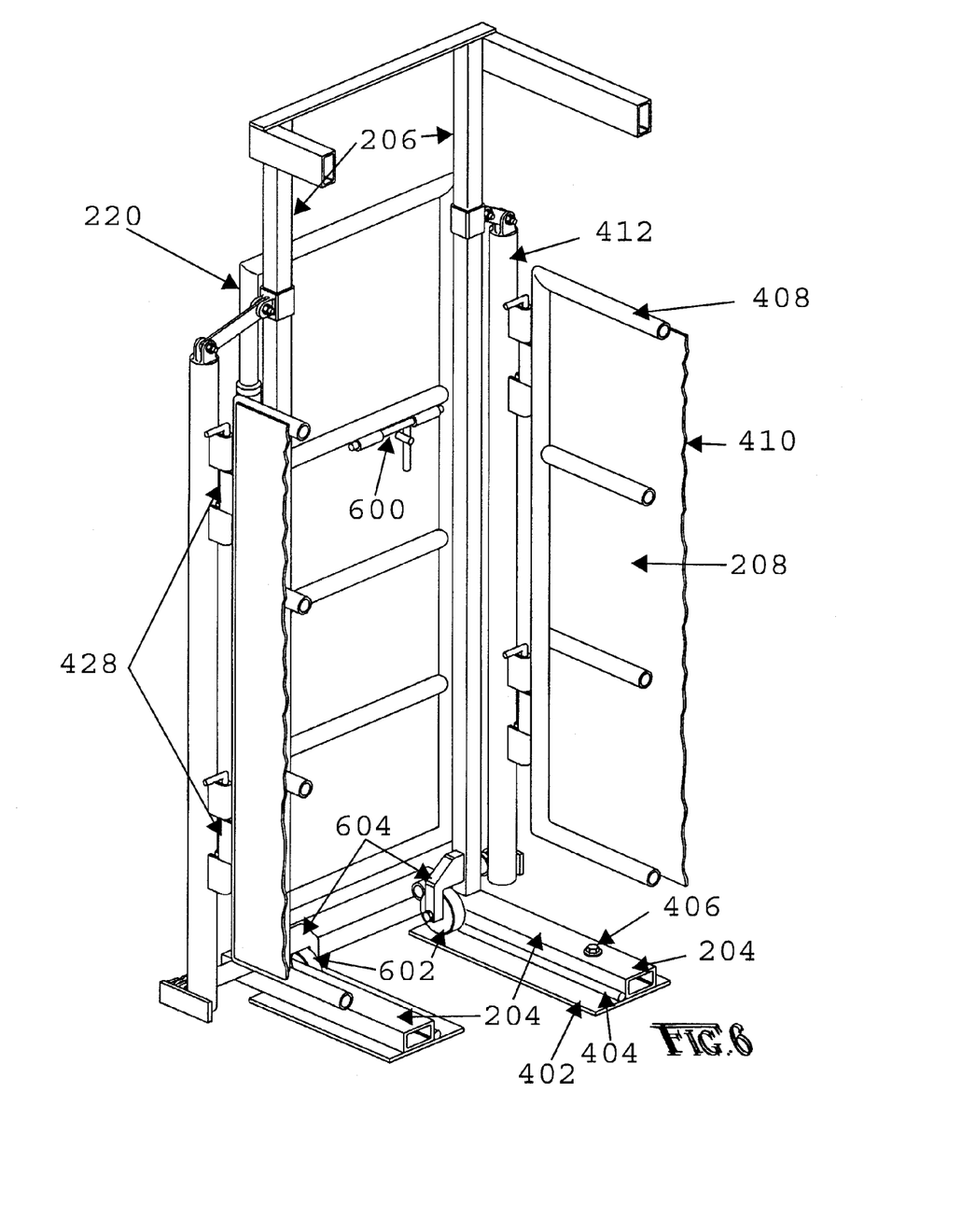
FIG. 6 is a partial perspective view of an embodiment of the corral assembly installed into a livestock trailer.

Referring now to FIG. 6, a detailed cut-away view of a portion of the corral assembly 102 is depicted. For purposes of clarity, some elements of the corral assembly have been removed from this view, either in whole or in part. FIG. 412 depicts the area of the corral assembly 102 adjacent to the end panel 220.

The end panel 220 is provided to span the end of frame 200. Panel 220 is formed in the same manner as panels 208 described above. The panel 220 is mounted to vertical members 206 by hinges on one edge and is secured to the other vertical member 206 by a gate latch 600. In the embodiment shown in the figures, the gate latch 600 is a bolt type gate latch, but other types of latches may be used as desired.

The vertical members 206 are provided with wheels 602 to support the frame 200 on the rails 400 and to allow the frame 200 to be inserted into and removed from the trailer 100. The wheels 602 are attached to the vertical member 206 by brackets 604, and are disposed so that the wheel 602 and the horizontal frame member 204 are disposed on opposite sides of guide 404 on rail 400. The guide 404 maintains the wheel 602 and frame member 204 in the proper position as the frame 200 is inserted and removed from the trailer 100. A plurality of wheels 602 or other rollers are mounted at the bottom of the frame 200, at various locations along the length thereof. These wheels or rollers are large enough that the frame 200 is easily rolled into a livestock trailer 100.

Figure 7:
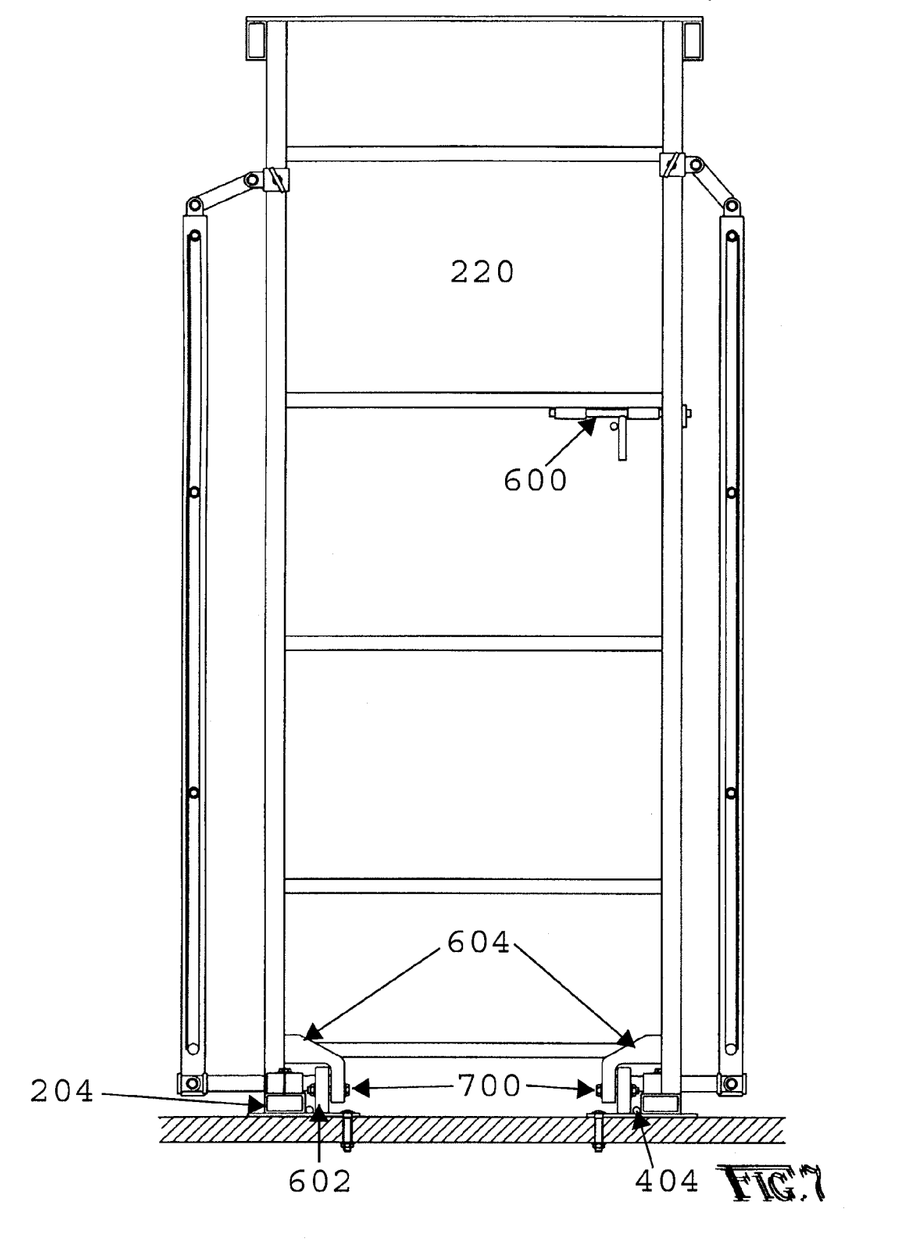
FIG. 7 is a cross-sectional view of an embodiment of the corral assembly installed in a livestock trailer.

Referring now to FIG. 7, a cross-sectional view of an embodiment of the corral assembly 102 is depicted adjacent to end panel 220. The bolt 700 rotatably attaches wheel 602 to bracket 604. The position of member 204 and wheel 602 on opposite sides of guide 404 on both rails 400 keep the frame 200 stable and appropriately supported as the frame 200 is inserted into or removed from trailer 100.

Figures 8, 9:
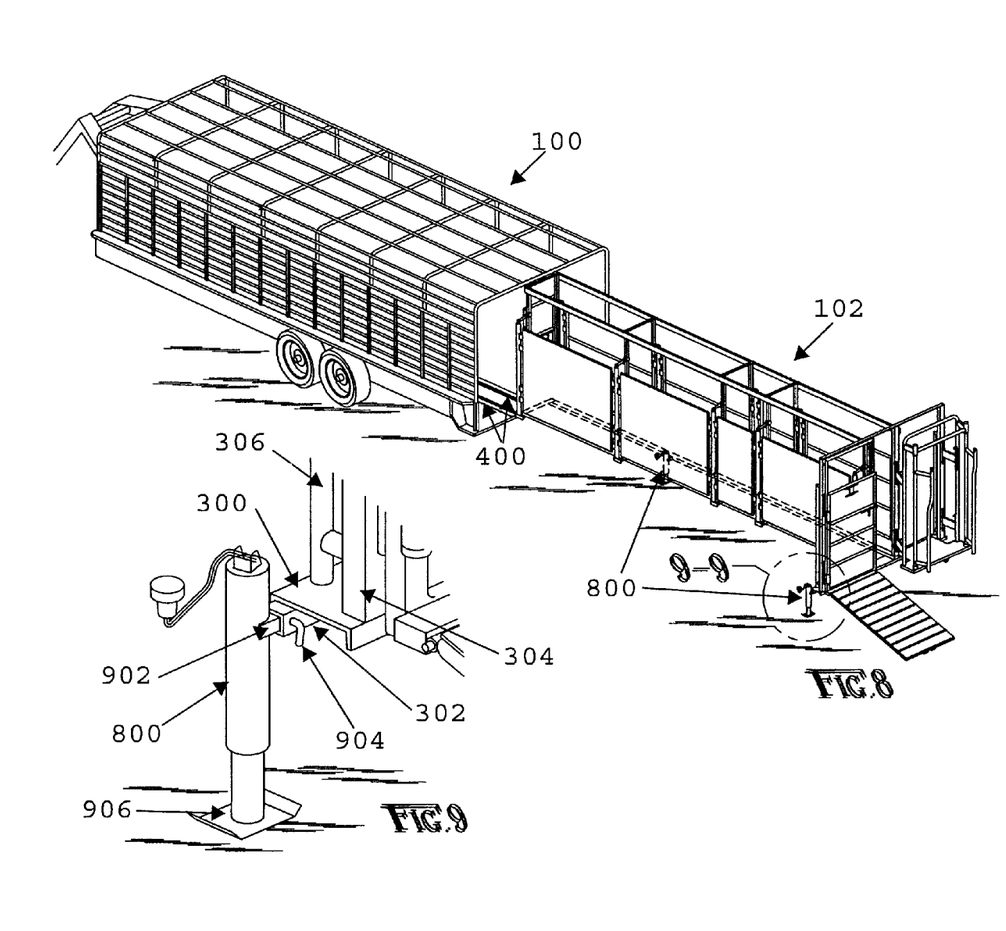
FIG. 8 is a perspective view of an embodiment of the corral assembly partially installed in a livestock trailer.
FIG. 9 is a detail perspective view of an embodiment of the corral assembly.

Referring now to FIG. 8, an perspective view of the corral assembly 102 is depicted as it is inserted into or removed from the trailer 100. As the assembly 102 is removed from the trailer 100, means for supporting the assembly 102 are provided at various points on the frame 200 and on gate frame 212. In the embodiment shown in the figures, removable jacks 800 are provided to allow for level support of the frame 200 on varying terrain. As the frame 200 is removed from the trailer, the jacks 800 are installed on the frame 200 at the appropriate points and lowered until contact with the ground provides support for the weight of the frame 200. Then the trailer is pulled away from the frame 200 until the next mount point for a jack 800 is outside the trailer 100. The numbers of jacks 800 necessary to support the frame 200 vary depending on the length of frame 200 and the weight of the assembly 102. Typically jacks 800 are provided on gate frame 212.

Referring now to FIG. 9, a detailed view of one of the jacks 800 is depicted. The jack 800 depicted in the figure is attached to the end of gate frame 212. Tube 302 which is a part of gate frame 212 extends from the end of the gate frame 212 and acts as a receiver for insert 902 attached to jack 800. Similarly to a receiver hitch, tube 302 and insert 902 are provided with holes for receiving pin 904 to secure jack 800 in place. Similarly, at other spots on frame 200 where it is desired to have a jack 800, a tube similar to tube 302 is provided to receive an insert 902 attached to a jack 800. Once the jack 800 is secured to the assembly 102 by means of the receiver hitch, then the foot 906 of jack 800 is lowered into contact with the ground sufficient to hold the weight of the assembly 800.

The innovative device, when installed in a livestock trailer, works extremely well with portable corral systems formed of interlocking livestock panels. Such panels can be set up at the rear or open end of the trailer to form a corral, holding pen, or a driving lane which is used to manipulate livestock toward the trailer.

Livestock trailers often have a forward side door. The innovative corral assembly works well to segregate animals. A number of animals are driven into the trailer and captured in the aisles. The animals are separated using the swing gates. Once the animals have been segregated, they may be selectively released through side doors as appropriate. This works particularly well when sorting animals by size, age or condition.

Operation of the present invention is very simple. When the portable corral assembly is needed, the livestock trailer 100 is positioned near the corral assembly 102 with the end panel 220 oriented toward the front of the trailer 100. The corral assembly 102 is then placed into the livestock trailer. Loading of the corral assembly 102 can be accomplished in any number of loading methods. It is asserted that two workers can easily load the corral assembly in to a livestock trailer. It is also possible to pick up the corral assembly using the front end loading assembly of a tractor and placing it into the livestock trailer. Other loading methods may become apparent. Because the corral assembly does not have to be fastened to the inside of the livestock trailer, it is ready for use. It is understood, however, that it may be desirable to provide and adjust stabilizing bars or otherwise fasten the corral assembly within the trailer to prevent unwanted movement during use. When the corral assembly is no longer needed, it is simply pulled out of the livestock trailer by force.

While the present invention is described herein with reference to the embodiments illustrated for particular applications, it should be understood that the invention is not limited thereto. Those having ordinary skill in the art and access to the teachings provided herein will recognize additional modifications, applications, and embodiments within the scope thereof and additional fields in which the present invention would be of significant utility. It is therefore intended that the scope of the present invention only be limited by the claims appended hereto.

What is claimed is:

1. A corral assembly for livestock comprising
a livestock trailer having two side walls, a front wall and a rear end; and
a frame and a plurality of panels attached to the frame, each of the plurality of panels having an inside surface and an outside surface;
wherein the frame is removably inserted into the rear end of the livestock trailer to define a central walkway along a portion of the longitudinal axis of the livestock trailer between the inside surfaces of the plurality of panels, said central walkway having a first end in communication with the rear end of the livestock trailer;
wherein a livestock path defined between the outside surfaces of the plurality of panels and the livestock trailer is disposed around the central walkway when the frame is disposed in the livestock trailer, the livestock path having first and second ends in communication with the rear end of the livestock trailer and located on either side of the first end of the central walkway; and
wherein each panel of the plurality of panels may be removed to adjust the length and width of the corral assembly.

2. The corral assembly for livestock of claim 1 further comprising a rail attached to the livestock trailer for receiving a plurality of rollers attached to the bottom of the frame.

3. The corral assembly for livestock of claim 2 wherein the frame further comprises a livestock control device attached substantially across one or both ends of the livestock path.

* * * * *